Feb. 17, 1970 L. GASSER ET AL 3,496,302
VOICE-FREQUENCY KEY DIALLING PROVIDING FOR REPEATED CONNECTION OF A REGISTER AT AN ESTABLISHED CONNECTION
Filed Dec. 1, 1965
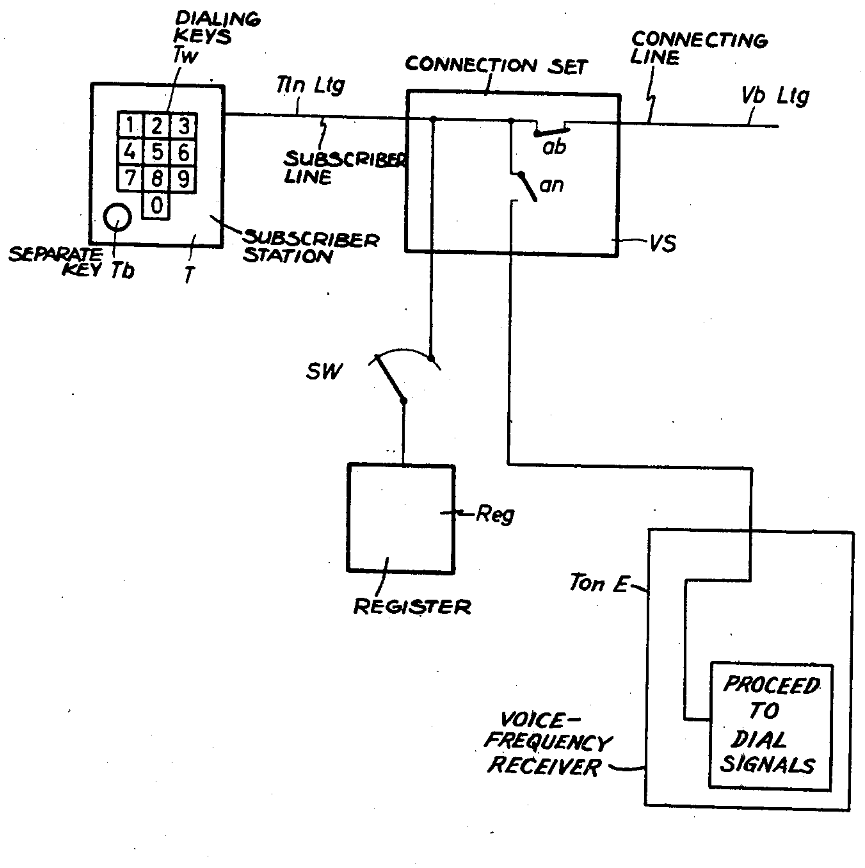

United States Patent Office 3,496,302
Patented Feb. 17, 1970

3,496,302

VOICE-FREQUENCY KEY DIALLING PROVIDING FOR REPEATED CONNECTION OF A REGISTER AT AN ESTABLISHED CONNECTION

Lorenz Gasser, Akazienweg, and Otto Baade, Herdweg, Germany, assignors to International Standard Electric Corporation, New York, N.Y.

Filed Dec. 1, 1965, Ser. No. 510,766
Claims priority, application Germany, Dec. 8, 1964, 1,236,598
Int. Cl. H04m *3/42*
U.S. Cl. 179—16 4 Claims

ABSTRACT OF THE DISCLOSURE

A way is provided to enable voice-frequency key dialling without the use of direct current key signals. An inexpensive receiver is provided to distinguish voice-frequency signals having relatively long duration from normal speech.

The invention relates to voice-frequency key dialling permitting repeated connection of a register to a connection set. In particular, it relates to such dialing which functions without recourse to direct current key signals in telecommunication equipment such as telephone systems.

Voice-frequency key dialling is known which functions without being unduly influenced by speech signals. Freedom from interaction with speech signals is maintained by selecting particular signal codes and by the use of voice-frequency receivers which are equipped with speech immune circuits. The speech immune circuits are chosen to respond to desired signals at voice frequencies and to distinguish these signals from ordinary voice signals by sensing the differences in the duration and changes in the intensity of the respective signals. These steps exhibit certain advantages when they are compared with the methods employing direct current dial pulse auxiliary signals. For example, the transmission route does not need to be made capable of transmitting direct current signals and at the same time possible dialling speed is greatly increased. The voice-frequency receivers necessary to receive the code signals are accommodated in registers which are connected to the connection sets while the connection is being established. The entire evaluation of the code signals is made in the register and the connection set can be made very simple.

In telephone systems it is sometimes required that signalling be initiated while a prior connection is still established. This may be necessary, for example, when calling a certain subscriber or operator's position, or when cutting into conversations. Since the register in this mode of operation is already disconnected from the connection set, the code signals emitted under such circumstances by the subscriber station can no longer be evaluated in such a connection set.

A method is known in the prior art by means of which there is emitted a dial pulse preparation signal as each digit is dialled. During the time a connection is established this preparation signal connects a central dial pulse receiver to the speech path. After the connection has been established the connection is prepared for further switching, as each digit arrives, by the dial pulse-preparation signal, depending on the same existing condition. This dial preparation signal is, in the method known to the prior art, a direct current signal which has the previously mentioned disadvantages of being dependent on the transmission path and of providing relatively slow signal transmission.

A method has also been proposed in the prior art which uses a direct current signal for other than speech immunity. This method permits a quicker dial pulse transmission and evaluation. By this method a direct current signal is emitted together with each voice-frequency signal. If a connection is established, a dial pulse receiving facility is again connected to the connection set via a direct current signal receiver and via a wideband voice-frequency receiver. By this method too, the transmission path must be capable of transmitting direct current signals.

Another prior art technique involves the use of voice-frequency key dialling without direct pulse supervising signals with speech immunity circuits. With this technique, an additional direct current signal is emitted only when the connection is established. Thereby, the direct current signal can be generated by actuating an additional key or by simultaneously actuating a defined combination of dialling keys. This method possesses the advantages of quick dial pulse transmission and evaluation, but is bound to a transmission path which transmits direct current.

It is an object of the invention to provide for voice frequency key dialling in which a register can be connected again to receive voice-frequency signals, even while a previously established connection remains established, without requiring a transmission path able to transmit direct current signals.

Improved voice frequency key dialling is attained according to the invention by connecting the subscriber circuit during a call established via a contact in a a connection set with a relatively cheap speech-immune voice-frequency receiver. The voice-frequency receiver is tuned to a defined frequency combination and has a small speech immunity factor, but a long speech immunity period. The term "small speech immunity factor" means that the voice frequency receiver has small sensitivity to the difference between voice-frequency signals and speech, so that if both are received at the same time the receiver will not switch "off" immediately. The term "long speech immunity period" means that the voice-frequency receiver is able to distinguish the longer duration of a combination of voice frequency signals such as are used in multi-frequency key dialling from pure normal speech and to eliminate pure normal speech on this basis. When the voice-frequency receiver responds, a determination is made of which subscriber station is emitting, and the station again connects a register to the connection set to receive the dial pulses, and initiates the emission of a proceed-to-dial tone to said subscriber station.

The invention uses no direct current signals. In order to obtain nevertheless a proper function, it is provided that the speech-immune voice frequency receiver has such a small speech immunity factor that at simultaneous occurrence of the defined frequency combination and speech from said calling subscriber it is not switched off, and it possesses a sufficiently long speech immunity period to enable it to distinguish the longer duration of a defined frequency combination from pure normal speech.

The main discriminating feature between speech and the defined frequency combination is the duration and the unchanged intensity of the frequency combination. In key dialling according to the invention the defined frequency combination is generated to initiate the transmittal of voice-frequency signals and dial pulses to establish a connection through an elongated actuation of a separate key or through an elongated, simultaneous actuation of a defined combination of dial keys and consists of a frequency combination not used for dialling digits. It is thereby made certain that erroneous touching of a key will not cause an established call to be interrupted. When a defined frequency combination is generated an extended key actuation is required. Since this key or said key combination is not used during the normal dialling, but used once at the seldom switching-overs from one station to the other when the connection is already established, the time delay does not influence the seizing of control members while a call is being established.

The speech-immune voice frequency receiver must determine which one of the connected subscribers is emitting the defined frequency combination. A possibility to solve this problem is that the speech-immune voice-frequency receiver investigates the emitting subscriber station by disconnecting the connection between the subscriber line and the connection line in the set at the break-contact and checks the reception of the defined frequency combination, at the subscriber line leading from the connection set to the subscriber station, eventually with an increased speech immunity.

The subscriber requesting switch-over obtains connection to a register in the connection set for dial pulse reception.

The invention is now in detail explained with the aid of the accompanying drawing. The drawing shows a functional block diagram of facilities for participating in the method according to the invention.

During a normal connection, a subscriber station at T is connected with a register R*eg* via the connection set VS. The register R*eg* contains the necessary speech-immune voice-frequency receivers, to receive the voice-frequency dial pulses. Since this facility is relatively expensive, the register is used by many subscribers in common. After the connection has been established the register is switched off again, in order to be available for other subscribers.

In the method according to the invention at this moment, i.e. immediately after the connection has been established, a relatively cheap voice-frequency receiver T*on* E is connected to the subscriber line T*ln* L*tg* via the contact "*an*" in the connection set VS. If the subscriber now wants a call transfer while the connection is established, or if he wants to dial further digits, he can cause additional signals to be emitted either by prolonged actuation of the separate key T*b* or by prolonged simultaneous actuation of a defined combination of dial keys T*w*. Either course will produce a special frequency combination.

The speech-immune voice-frequency receiver T*on* E, tuned to such a special frequency combination and having a small speech immunity factor with a long speech protection or immunity period, recognizes the wish of one of the two subscribers to be again connection with a register, supposed to receive voice-frequency dial signals. But the voice-frequency receiver T*on* E cannot recognize in this condition which of both call-participating subscribers has emitted the particular frequency combination.

According to a further feature of the invention the voice-frequency receiver T*on* E disconnects the established connection between subscriber line T*ln* L*tg* and the connecting line V*b* L*tg* through a circuit, not shown on the drawing, at the break-contact "*ab*," as soon as it receives the special frequency combination. If the frequency combination remains at its input after the separation, it must be the shown subscriber station T, viz the calling subscriber. The voice-frequency receiver T*on* E thereupon initiates an available register R*eg* to connect itself to the connection set via a line finder SW. Now the subscriber station T can forward voice-frequency dial pulses again to the connected register R*eg*. In order to inform the subscriber of this readiness to receive further voice-frequency dial signals, it is provided that the voice-frequency receiver causes the emission of a proceed-to-dial tone to said subscriber station T.

What is claimed is:

1. A voice-frequency key dialing system for transmitting voice-frequency signals and dial signals at previously established connections, comprising:

a subscriber line,
a speech-immune voice-frequency receiver,
a connection set,
means, including said connection set, for interconnecting said subscriber line and said voice-frequency receiver,
a register,
means for connecting said register to said subscriber line through said connection set,
said voice-frequency receiver responding to defined frequency signals from a subscriber station to initiate connection of the register to receive dial pulses and to initiate connection of a proceed-to-dial tone to said subscriber station.

2. A voice-frequency key dialing system as claimed in claim 1, in which the speech-immune voice-frequency receiver has a speech immunity factor relatively shorter in duration than the speech immunity period of the receiver,
said relatively short speech immunity factor preventing said receiver from switching off immediately upon receipt simultaneously of said defined frequency signals and speech, and
said speech immunity period enabling said receiver to distinguish the prolonged appearance of said defined frequency signals from speech.

3. A voice-frequency key dialling system as claimed in claim 1, in which said defined frequency signals are generated in response to actuation of a defined combination of dialling keys,
said defined frequency signals consisting of signals having a frequency not used for dial signals.

4. A voice-frequency key dialling system as claimed in claim 1 including a connecting line the speech-immune voice-frequency receiver supplying signals to disconnect the subscriber line from said connecting line, and checking for the reception of defined frequency signals on said subscriber line.

No references cited.

KATHLEEN H. CLAFFY, Primary Examiner

J. S. BLACK, Assistant Examiner

U.S. Cl. X.R.

179—84